United States Patent [19]

Phillips

[11] E Patent Number: Re. 31,960

[45] Reissued Date of Patent: Jul. 30, 1985

[54] COMPOSITES AND METHODS FOR PROVIDING METAL CLAD ARTICLES AND ARTICLES PRODUCED

[75] Inventor: Cecil L. Phillips, Boughton, England

[73] Assignee: Scott Bader Company Limited, Great Britain

[21] Appl. No.: 658,337

[22] Filed: Oct. 5, 1984

Related U.S. Patent Documents

Reissue of:

[64] Patent No.: 4,421,827
Issued: Dec. 20, 1983
Appl. No.: 340,405
Filed: Jan. 18, 1982

[30] Foreign Application Priority Data

| | | | |
|---|---|---|---|
| Jan. 21, 1981 | [GB] | United Kingdom | 8101796 |
| Jan. 21, 1981 | [GB] | United Kingdom | 8101797 |
| Jun. 19, 1981 | [GB] | United Kingdom | 8118988 |
| Oct. 6, 1981 | [GB] | United Kingdom | 8130121 |

[51] Int. Cl.[3] ..... B29D 9/08; B29H 9/00; B32B 15/08

[52] U.S. Cl. ..... 428/418; 428/423.3; 428/423.7; 428/424.4; 428/429.7; 428/425.8; 428/425.6; 428/458; 428/463; 428/483; 428/520; 156/330; 426/131; 174/50.51

[58] Field of Search ..... 428/425.8, 418, 463, 428/423.3, 423.7, 424.4, 483, 520, 425.6; 156/330

[56] References Cited

U.S. PATENT DOCUMENTS

| | | | |
|---|---|---|---|
| 3,864,153 | 2/1975 | Enomoto | 428/423.3 |
| 3,911,178 | 10/1975 | McDowell et al. | 428/423.3 |
| 3,993,841 | 11/1976 | Matsubara et al. | 428/418 |
| 4,279,962 | 7/1981 | Meyer et al. | 428/418 |
| 4,421,827 | 12/1983 | Phillips | 428/418 |

FOREIGN PATENT DOCUMENTS

| | | |
|---|---|---|
| 1431324 | 4/1976 | United Kingdom . |
| 2061834 | 5/1981 | United Kingdom . |

*Primary Examiner*—Peter C. Ives
*Attorney, Agent, or Firm*—Townsend and Townsend

[57] ABSTRACT

A composite for providing a metal clad article of thermosetting resin includes a metal facing, a curable thermosetting resin and, between the metal facing and the resin, a layer of adhesive material. The adhesive material is capable of adhesion to the metal facing and to the thermosetting resin on curing of the resin to thereby bond the metal to the resin. The thermosetting resin may be cured hot or cold, some adhesives being more suitable for one or other method.

16 Claims, No Drawings

COMPOSITES AND METHODS FOR PROVIDING METAL CLAD ARTICLES AND ARTICLES PRODUCED

Matter enclosed in heavy brackets [ ] appears in the original patent but forms no part of this reissue specification; matter printed in italics indicates the additions made by reissue.

FIELD OF THE INVENTION

This invention relates to composites for providing metal clad articles of thermosetting resin, methods of making the metal clad articles and metal clad articles so produced.

BACKGROUND OF THE INVENTION

Fibre reinforced plastics (FRP) laminates especially those based on thermosetting resins such as unsaturated polyesters, vinyl esters, epoxides, phenolics, furans and silicones have found wide use in industry. By correct choice of resin type and reinforcement the laminates can be used in the production of pipes, ducts, tanks, vessels for chemical plants, cladding and decorative panels for building, containers, tanks and pipes for potable liquids and foodstuffs, boats, cars and commercial vehicles, railway coaches, and many other applications.

However there are some aggressive environments that attack some or all the resin matrices that are used. This disadvantage has been overcome in some instances by the use of thermoplastics such as rigid polyvinyl chloride, polypropylene or fluorinated ethylene/propylene copolymers as facings to the laminate. Even so there are applications where metals such as aluminum or stainless steel perform better than FRP or FRP with a thermoplastic facing but where the lightness and load bearing properties of FRP would be an advantage.

Very thin sheets of metals (e.g. stainless steel) down to about 0.008 cm thick are now available and many applications can be foreseen where a material of this type with a FRP backing could be used, namely decorative metal faced building panels, metal faced sectional water tanks, metal lined pipes, ducts and tanks and metal faced components for the transport industry. Unfortunately, little or no adhesion can be obtained between stainless steel and thermosetting resins such as standard unsaturated polyesters and vinyl esters even with careful preparation of the stainless steel surface. It has been stated that some resins such as epoxides or polyurethanes are self bonding on to stainless steel (B.P. No. 2,061,834) but these suffer from other disadvantages such as cost (epoxides) and low stiffness (polyurethanes).

We have found a way by which excellent adhesion can be obtained between a metal and those thermosetting resins which are not generally considered as being capable of bonding to metal.

SUMMARY OF THE INVENTION

According to the invention there is provided a composite for providing a metal clad article, which composite includes a metal facing, a curable thermosetting resin and, between the metal facing and the resin, a layer of adhesive material capable of adhesion to the metal facing and to the thermosetting resin upon curing of said resin to form an adhesive bonding therewith.

On subjecting the composite to a curing operation, a metal clad article in accordance with the invention is provided in which the metal facing is efficiently and easily bound to the thermoset resin by the adhesive.

A method aspect of the invention includes the steps of providing, on the metal facing, a layer of adhesive material capable of adhesion to the metal facing, laying up on said layer of adhesive material a curable thermosetting resin, and curing the thermosetting resin, thereby bonding the adhesive material to the resin to provide the said metal clad article.

Any forming of the metal to a desired profile is carried out prior to bonding it to the other materials. The method of the invention is particularly applicable to the formation of profiled metal clad laminates of fibre reinforced thermosetting resin.

It is valuable that the method of the invention is a lamination onto the metal surface rather than the adhesion of the metal surface to a preformed laminate. Thus the cladding of the metal takes place at the same time as the formation/cure of the laminate when the thermosetting resin is brought together with the adhesive material and metal. This enables the adhesive material to bind with the thermosetting resin of the laminate on curing thus providing a surprisingly excellent adhesive bond between metal and laminate.

Excellent adhesion may be obtained between the metal and thermosetting resin by treating the metal surface with an adhesive material selected from a wide range of primers/adhesives the choice of which is explained in more detail hereinafter, allowing it to dry or cure and applying the thermosetting resin plus reinforcement (if required) in the uncured state and then curing the thermoset. The thermosetting resins may be applied in combination with reinforcement (if required) in either the wet state by standard processes, e.g. hand lay-up, spray up, filament winding, resin injection (with or without vacuum assistance) cold press moulding, flexible bag moulding, rotational moulding and pultrusion and cured at ambient, or elevated temperatures or as pre-impregnated material or formulated moulding material such as sheet moulding compounds (SMC or its "high performance" derivatives HMC, XMC), bulk moulding compounds (BMC), dough moulding compounds (DMC) and granules etc. pressed into contact with the treated surface and cured by heating under conventional hot press moulding conditions.

The metals can be formed into shape before lamination for example by pressing, cutting and welding, bending and stitching.

When the thermoset resin is reinforced, this is preferably achieved using reinforcing fibres of, for example, glass, silica, carbon, KEVLAR ® and similar polyaramids, and natural fibres such as jute.

The reinforcing fibre may be provided by at least one layer of fibrous material and this is preferably preimpregnated with the thermosetting resin ("prepreg"). Alternatively the fibres may be distributed within the thermosetting resin, as for example is the case with DMC.

Available adhesives are classified generally by their chemical nature (Adhesives Directory 1981, Wheatland Journals Ltd, Rickmansworth):

(a) Natural Products, e.g. starch, bone glue,
(b) Cellulosics, e.g. cellulose acetate,
(c) Elastomerics, e.g. natural rubber,
(d) Synthetic Rubbers, e.g. nitrile, Neoprene ®, styrene/butadiene, (e) Thermoplastics, e.g. cyanocrylates, hot melts (e.g. ethylene/vinyl acetate, polyamide) polyvinyl acetate, polyvinyl butyral, acrylics and copolymers, (f) Thermosets, e.g. addition polymers such as epoxides, polyesters, vinyl esters, urethane acrylates, urethanes, anaerobic acrylics or condensation polymers, e.g. phenol formaldehyde, urea formaldehyde, (g) Inorganic, e.g. sodium silicate.

We find that, in general, adhesives of groups (a), (b) and (g) do not work. In particular, inorganic adhesives (g) tend to be too rigid to form good bonds with the thermosetting resins forming the laminate.

Preferred adhesive materials are those selected from group (f) and certain members of groups (c), (d) and (e), though we find that aqueous based adhesives within these latter groups in emulsion form tend to be inferior. Such aqueous based adhesives may, however, provide adequate adhesion on hot curing of the thermosetting resin forming the laminate.

The adhesive capability of an adhesive material is regarded as good if the resultant metal clad laminate has a lap shear of at least 3, and preferably $\gtrsim$3.5 Megapascals (MPa). It is strongly preferred that the lap shear strength be no less than 2.5 MPa.

The choice of adhesive material depends upon the nature of the thermosetting resin which is to form the laminate (the adhesive material must be compatible with the resin) and the metal facing to be provided. It depends also upon the conditions of curing to be employed.

Some adhesive materials provide good results only when used with a hot cured laminate and certain of the thermoplastics and natural and synthetic rubbers fall into this category. Such hot curing is generally carried out at a temperature in the range 100°-200° C., preferably 140°-160° C., more preferably 150° C., and usually under pressure (about 1000–2000 psi, preferably 1500 psi).

On the other hand, other adhesive materials provide good results when used with a cold cured or a hot cured laminate, these including certain thermosetting resins and synthetic rubbers. Such cold curing is generally carried out at about ambient temperature, but may be followed by a "post-curing" step in which the material is heated to say 30°-120° C., preferably at least 40° C.

For excellent results both on cold and hot curing of the laminate, an adhesive is selected which:

(a) provides a good key to the metal surface (there are certain adhesives known to be useful for bonding metal to metal and some of these, though not all, are useful in the method of the present invention), (b) is flexible, tough or resilient, i.e. having low modulus and (c) is curable by crosslinking with minimum shrinkage before application of the laminating resin system.

Examples of adhesives which may give good results (though in some cases hot curing of the laminate is required) are thermosetting resins which contain polyurethane linkages and optionally additionally include acrylic (especially acrylate) linkages or terminal groups, acrylic resins (especially anaerobic acrylics), epoxy resins, unsaturated polyesters (provided that they form sufficiently flexible layers on curing), polymers containing vinyl acetate residues, nitrile rubbers, polyolefine and nitrile hot melt adhesives, cyanoacrylates, neoprene and natural rubbers.

Those adhesive materials which provide good results on hot curing of the laminate include hot melt polyolefins which may contain vinyl acetate residues.

Epoxy resins are also preferred for hot curing but will give excellent results on cold curing of certain thermosetting resins which form the laminate, e.g. epoxy thermosetting resins.

Some, though few adhesive materials, e.g. cyanoacrylates, give good results on cold curing of the laminate, but not on hot curing.

Adhesives which, in general, give excellent results both on cold and hot curing of the laminate include acrylics (especially anaerobic acrylics), certain unsaturated polyesters as later described, thermosetting resins which contain polyurethane linkages and optionally additionally contain acrylic (especially acrylate) linkages or terminal groups, and nitrile rubbers. In particular, nitrile rubbers provide excellent adhesion when used with a cold cured laminate.

This range of adhesives allows for a particularly wide choice of metal, thermosetting resin and curing conditions and this versatility is surprising. For example, although nitrile rubbers are known adhesives they have, in general, been applied only by hot curing in conventional adhesion processes. This contrasts with the excellent results we obtain on cold curing.

Excellent results can be achieved on cold curing, especially with the abovementioned range of adhesives. This enables the process to be carried out without having to apply heat, thus saving energy and rendering it easier and more economical to perform.

We also find that particularly excellent results may be achieved if the adhesive is allowed or caused to cure completely before the thermosetting resin is laid on it.

This is especially so for cold curable resins, e.g. epoxy resins, acrylics, nitrile rubbers and urethanes.

An especially preferred adhesive is one containing polyurethane linkages with terminal acrylate groups.

The preparation of a typical urethane/acrylate of this type is described below.

1.0 M Sorbitol and 18.0 M ε-Caprolactone were charged to a suitable reaction vessel and heated to 90°-100° C. with stirring. A cloudy homogeneous dispersion was obtained to which was added 0.2% p-toluene sulphonic acid. An exothermic reaction began almost instantaneously and the temperature rose peaking at 140°-150° C.

The batch was allowed to cool naturally for 15 minutes and was then vacuum stripped. Less than 2% of charge weight was removed.

After stripping, the temperature was adjusted to 100°-110° C. and 3.5 M isophorone di-isocyanate was added. A gentle exotherm began and the bath temperature was allowed to rise to 120°-130° C. where it was controlled by cooling.

When the exotherm was over, the batch was cooled to 90°-95° C. and 3.5 M 2-hydroxy ethyl acrylate and 100 ppm hydroquinone was added. A below the surface feed of air was started and the temperature was adjusted to 80°-85° C. The batch was maintained at this temperature until the isocyanate content was less than 0.6% (equivalent to 95% conversion). The batch was then dissolved in styrene to provide a composition containing approximately 60% solids by weight.

Although the most successful treatments are found to be based on anaerobic acrylics, urethanes, urethane/acrylics and nitrile rubbers, certain other treatments are usable if the three conditions above are fulfilled. For example, standard unsaturated polyesters do not give any adhesion due to their being too rigid and exhibiting too great a shrinkage on cure. However, using a specially formulated unsaturated polyester with an elongation at break (in cured form) of 50% and lower shrinkage than normal, good bonding is achieved.

Again epoxy materials are well known metal adhesives but unless well cured prior to the application of the thermosetting resin which is to form the laminate (with resins other than epoxides) they give rise to interfacial problems through either attack of solvents on the partially cured epoxy or inhibition of the cure of the FRP by substances leached from the partially cured epoxy.

The adhesive material may be used in any suitable form, e.g., dissolved in a solvent, as a melt, as a powder, or as a discrete sheet of material. It may be a single- or two-component system. Depending upon the form of adhesive selected, it may be applied to the metal by, for example, brushing or spraying or simply laying it upon the metal surface. As some adhesive materials are anaerobic, i.e. only cure properly in the absence of air, a thin sheet of PTFE can be laid over the coat of material and left in place until the adhesive layer is cured, after which the sheet is removed before subsequent lamination. An alternative, though less preferred method of obtaining adhesion, is to apply the adhesive to the metal and before it cures to apply reinforcement, e.g. glass chopped strand mat, to the surface so than some of the fibres are in the adhesive layer whilst most are protruding. Some adhesive materials are available as hot melt films which can be melted on to the metal before subsequent lamination or, if the whole structure is to be cured by hot pressing, laid between the metal and the moulding composition or pre-impregnated material.

The thermosetting resins used to make the laminates may, for example, be unsaturated polyesters, vinyl esters, urethanes, acrylates, epoxides, phenolic resins, furans, or silicones, and may be copolymers, e.g. urethane/acrylates. Preferred resins are unsaturated polyesters, phenolic resins, furan resins and epoxy resins. They may be compounded with thixotropic agents e.g. gaseous silicas, fillers e.g. natural and precipitated calcium carbonates, clays, talc, mica, silica, hydraulic cements and pigments if required. The curing of these laminates can be, in the case of polyesters, vinyl esters and urethane acrylates, by organic peroxides and heat, organic peroxides plus so called accelerators, visible or U.V. light, electron beams and in the case of epoxides by the well known curing agents and for furanes and phenolics the various catalysts available.

The procedure is capable of being used with a wide range of metals in thicknesses of 0.08 mm upwards but normally the thinnest material would be used for economical reasons. The metals include stainless steel, chromium, titanium, aluminum, tin, copper, lead, zinc, phosphor bronze, nickel, molybdenum, galvanised steel, brass and mild steel. Good bonds, as measured by lap shear and peel strengths, can be obtained when the metals are solvent degreased before application of the adhesive material but improved adhesion can be obtained by abrasion followed by a solvent wipe, alkaline or acid etching.

Particularly preferred metal clad laminates of the invention are metal clad FRP laminates. Their structures combine the best features of the metals and FRP which can be summarised as:

(i) the high strength to weight ratio of FRP giving components of lower weight than if made wholly of metal, (ii) the imperviousness of metals which prevents moisture and other aggressive environments from attacking FRP and causing long term loss of strength and blistering, (iii) the chemical resistance of metal such as stainless steel, titanium and nickel alloys which allows a choice of metal according to the environment, (iv) the desirable hygienic properties of metals such as stainless steel for use in contact with foodstuffs and potable liquids, (v) very good reverse impact resistance as large loads can be sustained without failure of the metal facing, (vi) the fire resistance of the metal facing and absence of smoke which can be important for example inside a duct, (vii) the electrical properties of metal, i.e. conductance and shielding, (viii) the decorative properties of metal, i.e. in building panels.

Metal clad laminates of the invention are thus extremely versatile and have a very wide range of uses particularly in structural applications, for example, in the production of pipes, ducts, tanks, vessels for chemical plants, cladding and decorative panels for building, containers, tanks and pipes for potable liquids and foodstuffs, boats, cars and commercial vehicles, railway coaches, and many other applications.

There is no reason why the metal clad laminates should have only one metal face; both faces could be metal and they need not be similar metals. Similarly sandwich structures with light weight cores can be formed having one or both faces of metal foils, e.g. metal/primer/FRP/foam or honeycomb/FRP, or metal/primer/FRP/foam or honeycomb/FRP/primer/-metal.

DESCRIPTION OF PREFERRED EMBODIMENTS

Metal clad laminates embodying the invention, composites for providing them and methods of metal clad laminate formation will now be described in more detail with reference to the following Examples which include some comparative examples. The presently most preferred embodiments are those in which the laminate is cold cured.

EXAMPLE 1

A thin sheet of stainless steel (0.25 mm thick) was solvent degreased and coated with PERMABOND ®F241 adhesive (one component of a 2 pot acrylic system) and Permabond initiator No. 1 (hardener) at 200 g/m$^2$. This layer was covered by a polytetrafluoroethylene (PTFE) sheet until cured, when it was peeled off. A glass fibre reinforced polyester laminate was then laid up on the treated metal surface using CRYSTIC ®272 (an isophthalic acid based unsaturated polyester resin), suitably catalysed and accelerated, and 4 layers of glass chopped strand mat (450 g/m$^2$) at a resin:glass ratio of 2.3:1. The polyester of the resultant composite was then allowed to cure at ambient temperature to form a metal clad laminate.

When the polyester had cured it was extremely difficult to separate from the stainless steel facing (lap shear strength 3.5 MPa).

EXAMPLE IA

A sheet of stainless steel was coated with Permabond F241adhesive and a piece of satin weave glass fibre fabric (340 g/m$^2$) was immersed in an acetone solution of Permabond Initiator No. 1 (9 pts by weight acetone:1 part initiator) and the acetone allowed to evaporate. The glass fibre was rolled on to the treated stainless steel surface and good adhesion was obtained.

A glass fibre laminate was then laid up on the glass fabric using Crystic 272, suitably catalysed and accelerated, and 4 layers of glass chopped strand mat (450 g/m$^2$) at a resin:glass ratio of 2.3:1.

After the GRP layers of the resultant composite had been allowed to cure at ambient temperature it was extremely difficult to separate them from the stainless steel facing.

EXAMPLE II-XX

The procedure of Example I was followed except that the treatments shown in Table I was used.

TABLE I

| Example | Treatment/Type | Lap Shear Strength (MPa) |
|---|---|---|
| II | CRYSTIC ® 272 (Polyester) | <1 |
| III | TENAXATEX ® 3964 (Polyvinyl acetate emulsion) | 3 |
| IV | DERAKANE ® 411-45 (Vinyl ester) | <1 |
| V | INDASOL ® NS240 (Natural rubber latex) | <1 |
| VI | INDATEX ® SE765 (Acrylic emulsion) | <1 |
| VII | INDASOL ® CS 1659 (Neoprene latex) | <1 |
| VIII | PERMABOND ® E04 (2 pot epoxy RT cure) | <1 |
| IX | as VIII but cured 24 hours at 40° C. | 3 |
| X | CRODAFIX ® 27-8-700 (Ethylene/vinyl acetate emulsion) | 2 |
| XI | PERMABOND ® C (Cyanoacrylate with PTFE sheet curing) | 3 |
| XII | PERMABOND ® A (Anaerobic - cured 30 mins at 150° C. with PTFE sheet curing) | 3 |
| XIII | PERMABOND ® E15 (2 Pot epoxy - cured 24 hours at RT) | 4 |
| XIV | as XIII but thereafter post-cured for 24 hours at 40° C.) | 5.5 |
| XV | PERMABOND ® ESP110 (1 pot epoxy - cured 5 mins at 160° C.) | 4 |
| XVI | CRYSTIC ® D4176A (Flexible polyester cured 18 hrs at RT) | 4 |
| XVII | as XVI but then post-cured for 18 hours at 40° C. | 5.5 |
| XVIII | CRODAGRIP ® 14-00300 (2 pot polyurethane) | 5 |
| XIX | INDASOL ® MS419NF (Nitrile rubber) | 6 |
| XX | Polyfunctional acrylate terminated polymer containing urethane linkages with 80 pphr talc as filler | 6.5 |

EXAMPLE XXI

A sheet of stainless steel 0.25 mm thick was cut to conform to the shape of a flat plate mould 100×260 mm. The metal sheet was solvent degreased, coated with INDASOL ®MS419NF (a nitrile rubber adhesive) at 200 g/m$^2$ and allowed to dry. The treated metal was placed in the mould with the untreated side in contact with the lower mould surface and the mould loaded with CRYSTIC M125 (a sheet moulding compound) and reinforcing fibres to cover 70% of the surface area. The mould was closed and pressing of the resultant composite took 4 minutes at 150° C. under a pressure of 1,500 p.s.i. to effect curing.

On opening the mould a stainless steel faced FRP sheet was obtained which was extremely strong with good adhesion between the FRP and the metal face (single lap shear strength 5.5 MPa).

EXAMPLES XXII-XXXVII

The procedure of Example XXI was followed except that the treatments shown in Table II were used.

TABLE II

| Example | Treatment/Type | Lap Shear Strength (MPa) |
|---|---|---|
| XXII | CRYSTIC ® 272 (Polyester) | <1 |
| XXIII | DERAKANE ® 411-45 (Vinyl ester) | <1 |
| XXIV | TENAXATEX ® 4611 (nitrile phenolic) | <1 |
| XXV | NUTRIM ® 5003 (Nitrile phenolic ironed-on film) | <1 |
| XXVI | as XXV but cured 30 mins at 150°C. | 3 |
| XXVII | INDATEX ® SE765 (Acrylic emulsion) | <1 |
| XXVIII | TENAXATEX ®3964 (Polyvinyl acetate emulsion | 2 |
| XXIX | PERMABOND ® C (Cyanoacrylate) | 2 |
| XXX | INDASOL ® NS240 (Natural rubber latex) | 3 |
| XXXI | INDASOL ® CS1659 (Neoprene latex) | 3 |
| XXXII | CRODAFIX ® 27-8-700 (Ethylene/vinyl acetate emulsion) | 3 |
| XXXIII | IGETABOND 7B100 (Polyolefine copolymer hot melt) | 3.5 |
| XXXIV | CRODAGRIP ® 14-00300 (2 pot polyurethane) | 4 |
| XXXV | Polyfunctional acrylate terminated polymer containing urethane linkages with 80 pphr talc as filler | 4 |
| XXXVI | PERMABOND ® E04 (2 pot epoxy) | 4.5 |
| XXXVII | PERMABOND ® F241 (2 pot acrylic covered by PTFE sheet until cured) | 5.5 |

EXAMPLE XXXIIIA

The procedure of Example XXXIII was also carried out using Crystic ®M225A sheet moulding compound (fire retardant grade). On impact testing it was found that the GRP laminate could be fractured without penetrating the stainless steel facing. There was good adhesion between the FRP and metal face (single lap shear stength 3.5 MPa). Furthermore, after curing, the laminate was easily removed from the mould. The mould walls were of chrome plated steel; hence the laminate did not adhere to them.

EXAMPLES XXXVIII-L

The same procedure as in Examples I-XX or XXI--XXXVII were used but the stainless steel was replaced by thin sheets of other metals.

| | | | Lap Shear Strength MPa |
|---|---|---|---|
| XXXVIII | Aluminum | as Ex. I | 6 |
| | | as Ex. XXI | 5 |
| XXXIX | Copper | as Ex. XIX | 5.5 |
| | | as Ex. XXXVII | 4.5 |
| XL | Brass | as Ex. XVIII | 4 |
| | | as Ex. XXI | 4 |
| XLI | Zinc | as Ex. I | 6.5 |
| | | as Ex. XXXIV | 4.5 |
| XLII | Phosphor Bronze | as Ex. XX | 6.5 |
| | | as Ex. XXI | 3.5 |
| XLIII | Nickel | as Ex. XX | 7 |
| | | as Ex. XXI | 6 |
| XLIV | Tin | as Ex. XX | 5 |
| | | as EX. XXXV | 5 |
| XLV | Titanium | as Ex. XVIII | 5 |
| | | as Ex. XXXVI | 4.5 |

-continued

| | | | Lap Shear Strength MPa |
|---|---|---|---|
| XLVI | Molybdenum | as Ex. XIX | 9 |
| | | as Ex. XXXIV | 7 |
| XLVII | | as Ex. I | 2 |
| | | as Ex. XXXVII | 5 |
| XLVIII | Chromium | as Ex. XV | 4 |
| | | as Ex. XXXVI | 5 |
| XLIX | Mild Steel | as Ex. XX | 9 |
| | | as Ex. XXI | 7 |
| L | Galvanised Steel | as Ex. XIX | 7.5 |
| | | as Ex. XXXIV | 5.5 |

EXAMPLE LI

A sheet of stainless steel (0.5 mm thick) was solvent degreased and coated with INDASOL ®MS419NF (nitrile rubber adhesive) at 200 g/m$^2$. This was allowed to dry and a glass reinforced phenolic resin laminate laid up on the treated surface using 4 layers of chopped strand mat (450 g/m$^2$) at a resin:glass ratio of 3:1. After the glass reinforced phenolic resin of the resultant composite had been allowed to cure at ambient temperature it was difficult to separate from the stainless steel and the bond had a single lap shear strength of 3 MPa.

EXAMPLE LII

The same procedure as in Example LI was followed except that the laminating resin was a QUAKER furane resin.

EXAMPLE LIII

A sheet of aluminum (0.5 mm thick) was solvent degreased and treated with PERMABOND ®E04 (a two pot epoxy) at 200 g/m$^2$. This was allowed to cure and a glass reinforced epoxide laminate laid up on the treated surface using 4 layers of chopped strand mat (450 g/m$^2$) Epikote 828+Epicure at a resin:glass ratio of 3:1. After the glass reinforced epoxide laminate of the resultant composite had been allowed to cure at ambient temperature it was extremely difficult to separate from the metal (lap shear strength 6 MPa).

EXAMPLES LIV-LVII

A sheet of aluminum (0.25 mm thick) was solvent degreased and treated with INDASOL ®MS419NF (nitrile rubber adhesive) at 200 g/m$^2$. This was allowed to dry and one layer of 450 g/m$^2$ chopped strand mat (CSM) with Crystic 272 at a resin:glass ratio of 2.5:1 was laid up on the treated surface. A 12.7 mm thick PVC foam sheet was pushed into the wet resin layer and a 2 layer CSM (450 g/m$^2$ per layer)-Crystic 272 laminate was laid up on top of the foam to form a composite which, on curing at ambient temperature, provided a stiff metal clad foam cured laminate structure.

This procedure was repeated using polyester foam as a replacement core material, phenolic foam as a replacement core material and polyurethane as a replacement core materal.

EXAMPLE LVIII

Metal faced sectional tank panels can readily be made using the techniques developed.

A thin stainless steel sheet 4'4" square×0.5 mm thick had four corner squares 2"×2" cut from it and it was then folded to give a tray shaped sheet 4'×4' flanges all round. The corners were joined by welding or soldering. The inside surface of the formed tray was solvent degreased and treated with a nitrile rubber adhesive at 200 g/m$^2$ and allowed to dry.

The shaped primed metal tray was then transferred to the female tool in a press where it effectively became part of the tool. A charge of sheet moulding compound (SMC) (Crystic ®M125) sufficient to give the required laminate thickness was then loaded and the mould closed. Under the influence of pressure and heat the SMC of the resultant composite flowed and cured so that when released a stainless steel clad FRP sectional tank panel was obtained. Th bond between the stainless steel and the FRP was excellent and the panel had the following advantages over traditional steel or unfaced SMS panels:

a. the external SMC face requires minimal maintenance,
b. the internal surface is a well known and trusted corrosion resistant surface acceptable in the food industry,
c. the internal surface is impermeable and unlike SMC will not lose mechanical properties or blister on long contact with water,
d. the internal surface is not broken when large impact loads are applied to the outer surface.

Although the tray shape was made by cutting and welding the edges it can also be made by drawing the metal.

Simila processes can be used to manufacture automotive body parts, printed, circuit boards, filler plates and container panels etc.

EXAMPLE LIX

Metal lined pipes were formed by using the following technique:

A thin stainless steel sheet (0.25 mm thick) 12 inches wide was wound round a 12" diameter mandrel in a spiral fashion with a 1" overlap. The overlap joints were sealed using CRODAGRIP ®14-00300 (a 2 pot polyurethane).

The complete surface of the stainless steel was then covered with the same 2 pot polyurethane and allowed to dry to a layer 0.25 mm thick.

Glass fibre rovings impregnated with CRYSTIC ®272 (an isophthalic acid based unsaturated polyester resin), suitably catalysed and accelerated, were spirally wound on top of the primed stainless steel to give a reinforced layer 5 mm thick.

After allowing the resin of the resultant composite to cure at ambient temperature the pipe was removed from the mandrel.

The thin stainless steel liner provided a perfect barrier to a wide range of chemical environments and the structural rigidity was provided by the FRP winding.

Chemical tanks can be made by a similar process.

EXAMPLE LX

Metal lined ducts and pipes were made by an alternative technique in which the 0.25 mm stainless steel sheet 36" wide was joined longitudinally using an overlap joint and the metal chop bonded together with Crodagrip ®14-00300 (a two pot polyurethane). The 11" diameter metal liner was supported on a mandrel and the exterior surface was coated with a polyfunctional acrylate terminated polymer containing urethane linkages which had been suitably catalysed and accelerated. The priming layer with allowed to cure and glass rovings impregnated with DERAKANE ®411-45, suitably catalysed and accelerated, were spirally wound on top of the primed metal to give a reinforced layer 5 mm thick. After allowing the resin of the resultant composite to cure at ambient temperature the 12" diameter metal lined pipe thus produced was removed from the mandrel.

EXAMPLE LXI

Larger diameter pipes and tanks can be made by longitudinally jointing more than one sheet of metal liner. This can be done by using a fold stitching pistol, e.g. ATLAS COPCO Tagger 310, with a jointing film of PTFE tape between the metal faces and then folding over the jointed flange before applying a treatment of suitable adhesive. Thus 4 sheet of stainless steel 36" wide were joined together longitudinally as stated above to give the body of a circular tank approximately 45" diameter. This was placed on a mandrel and the external surface solvent degreased and coated with INDASOL ®MS419NF. When the coating was dry glass fibre rovings impregnated with CRYSTIC ®272, suitably catalysed and accelerated, were spirally wound on top of the primed steel to give a reinforced layer 5 mm thick. The resultant composite provided, after curing at ambient temperature, a metal lined tank which was removed from the mandrel.

EXAMPLE LXII

Thin aluminum sheet 0.45 mm thick was abraded, degreased and coated with a polyfunctional acrylate terminated polymer containing urethane linkages which contained 80 pphr talc filler, suitably catalysed and accelerated, at 200 g/m$^2$. After this had cured CRYSTIC ®272 resincontaining 33% by weight FILLITE® (silica hollow microspheres) was suitably catalysed and accelerated and poured onto the sheet to a depth of 10 mm. After this layer of the resultant composite had been allowed to cure at ambient temperature, one layer of 450 g/m$^2$ glass chopped strand mat was laid down and impregnated with catalysed and accelerated CRYSTIC ®272.

The resultant metal clad laminate could be used as a decorative building panel with the aluminum surface providing good weatherability.

EXAMPLE LXIII

Two sheets of stanless steel were solvent degreased treated with INDASOL ®MS419NF and allowed to dry. A layer of sheet moulding compound was sandwiched between the two treated surfaces and the resultant composite cured under heat and pressure. The double faced metal coated laminate showed good adhesion at all the interfacial bond lines.

Dissimilar metals can be used for each face to satisfy different environmental conditions.

EXAMPLE LXIV

A sheet of stainless steel (0.25 mm thick) was solvent degreased and treated with INDASOL ®MS419NF and allowed to dry. A laminate containing 6 layers of 300 g/m$^2$ woven KEVLAR® reinforcement and CRYSTIC ®272 at a resin:fibre ratio of 1:1 was laid up on the primed steel. After the resin of the resultant composite had been allowed to cure at ambient temperature, the resulting material was stronger and stiffer than an equivalent glass reinforced laminate due to the inherent better properties of KEVLAR fibres.

EXAMPLE LXV

A thin satin finish stainless steel sheet was pressed and drawn to the shape of an automobile boot lid. It was degreased with solvent and the inside surface coated with CRODAGRIP ®14-00300 at 200 g/m$^2$ which was allowed to cure. The shaped primed steel was then placed in a two part mould and the requisite amount of continuous strand glass fibre mat, tailored to fit the mould, laid on to the primed surface. The mould was closed and suitably catalysed and accelerated CRYSTIC ®272 (an unsaturated polyester resin) was injected into the mould until all the air in the mould had been pushed out. Injection of resin then ceased and the resin of the resultant composite was allowed to cure at ambient temperature. When the mould was opened a FRP boot lid was obtained with an attractive satin finish stainless steel face which had excellent adhesion to the FRP.

In the above examples, various commercial products have been described by trade names which are registered Trade Marks of the following respective companies.

CRYSTIC-Scott Bader Company Limited.
DERAKANE-Dow Chemical Company.
TENAXATEX-Williams Adhesives Limited.
INDASOL-Industrial Adhesives Limited.
INDATEX-Industrial Adhesives Limited.
PERMABOND-Permabond Adhesives Limited.
CRODAFIX-Croda Adhesives Limited.
CRODAGRIP-Croda Adhesives Limited.
NUTRIM-Aluminium Developments Limited.
IGETABOND-Sumitomo Chemical Company Limited.
LEVLAR-E I du Pont de Nemours Inc.

I claim:

1. A composite for providing a rigid metal clad article of thermosetting resin which composite includes a metal facing, a layer of adhesive material on the metal facing and, laid on the layer of adhesive material, an uncured curable thermosetting resin, the layer of adhesive material consisting essentially of a fully precured thermosetting or a thermoplastics material and being capable of adhesion to the metal facing and to the thermosetting resin at least upon curing of said uncured resin to form an adhesive bond with both the metal facing and the cured curable thermosetting resin.

2. A composite according to claim 1, wherein the adhesive material is effective upon cold curing of the said uncured curable thermosetting resin.

3. A composite according to claim 1, wherein the adhesive material is effective upon hot curing of said uncured curable thermosetting resin.

4. A composite according to claim 1, wherein the adhesive material is a fully cured thermosetting material selected from (a) a thermosetting resin which contains polyurethane linkages, (b) an acrylic resin, (c) an epoxy resin, (d) an unsaturated polyester, (e) a nitrile rubber and (f) a polymer containing vinyl acetate residues.

5. A composite according to claim 4, wherein the adhesive material is a thermosetting resin selected from the group consisting of acrylic, urethane and urethane/acrylic resin and nitrile rubbers.

6. A composite according to claim 5, wherein the adhesive material is a cured thermosetting resin selected from the group consisting of a nitrile rubber, a two pot acrylic resin, a two pot urethane resin and an acrylate-terminated polyurethane.

7. A composite according to claim 1, wherein the said curable thermosetting resin includes reinforcing fibre.

8. A composite according to claim 1, wherein the metal facing is selected fro the group consisting of stainless, mild or galvanised steel, aluminum, copper, brass, phosphor bronze, zinc, nickel, tin, titanium, molybdenum or chromium.

9. A rigid metal clad article of thermosetting resin consisting essentially of a metal facing, a cured thermosetting resin layer and, between the metal facing and the resin, a layer consisting essentially of a fully cured thermosetting or thermoplastics adhesive material, the article having been formed by applying to the metal facing the layer of adhesive material, bonding the said layer of adhesive material to the metal facing, which bonding is effected, when the adhesive material is a thermoplastics material, by heating the thermoplastics material and, when the adhesive material is a thermosetting material, by curing the thermosetting material, laying up on said layer of adhesive material an uncured curable thermosetting resin and curing the said curable thermosetting resin thereby bonding the adhesive material to the resin to provide the said metal clad article, which said step of curing the said curable thermosetting resin is, when the adhesive material is a thermosetting material, carried out after the said curing of the thermosetting material.

10. A metal clad article according to claim 9, wherein the thermosetting resin layer includes reinforcing fibre.

11. A method of forming a rigid metal clad article which includes the steps of applying to a metal facing a layer consisting essentially of thermosetting or thermoplastics adhesive material capable of adhesion to the metal facing, bonding the said layer of adhesive material to the metal facing, which bonding is effected, when the adhesive material is a thermoplastics material, by heating the thermoplastics material and, when the adhesive material is a thermosetting material, by fully curing the thermosetting material, laying up on said layer of adhesive material an uncured curable thermosetting resin and curing the said curable thermosetting resin thereby bonding the adhesive material to the resin to provide the said metal clad article, which step of curing the said curable thermosetting resin is, when the adhesive material is a thermosetting material, carried out after the said curing of the thermosetting material.

12. A method according to claim 11, wherein the said curing step is a cold curing step.

13. A method according to claim 11, wherein the adhesive material is a thermosetting material selected from the group consisting of nitrile rubbers and acrylic, urethane and urethane/acrylate resins.

14. A method according to claim 11, wherein the said curing step is a hot curing step.

15. A method according to claim 14, wherein the adhesive material is a thermoplastics material which is a hot melt adhesive in the form of a discrete layer.

16. A method according to claim 11 wherein the said step of curing the adhesive material is a cold curing step.

* * * * *